(12) United States Patent
Ngan

(10) Patent No.: US 7,123,911 B1
(45) Date of Patent: Oct. 17, 2006

(54) METHOD AND SYSTEM OF WIRELESS SIGNAL REPEATING

(75) Inventor: John Cheong-Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 468 days.

(21) Appl. No.: 10/214,673

(22) Filed: Aug. 8, 2002

(51) Int. Cl.
  *H04Q 7/20* (2006.01)
(52) U.S. Cl. .................. 455/435.2; 455/11.1; 455/13.1
(58) Field of Classification Search ................ 455/435, 455/11.1, 426, 3.02, 427, 12.1, 435.2, 435.1, 455/452.2, 7
See application file for complete search history.

(56) References Cited

U.S. PATENT DOCUMENTS

| | | | |
|---|---|---|---|
| 6,061,553 A * | 5/2000 | Matsuoka et al. | 455/273 |
| 6,501,938 B1 * | 12/2002 | Suenaga et al. | 455/3.02 |
| 6,570,858 B1 * | 5/2003 | Emmons et al. | 370/321 |
| 6,608,994 B1 * | 8/2003 | Wegener et al. | 455/3.06 |
| 6,678,259 B1 * | 1/2004 | Schwengler | 370/329 |
| 6,690,657 B1 * | 2/2004 | Lau et al. | 370/315 |
| 2001/0031646 A1 * | 10/2001 | Williams | 455/560 |
| 2002/0032031 A1 * | 3/2002 | Ogino et al. | 455/435 |
| 2002/0150117 A1 * | 10/2002 | Baba | 370/442 |
| 2003/0017803 A1 * | 1/2003 | Rubin et al. | 455/12.1 |
| 2003/0050099 A1 * | 3/2003 | Izadpanah | 455/562 |
| 2003/0157894 A1 * | 8/2003 | Han et al. | 455/67.1 |
| 2004/0157551 A1 * | 8/2004 | Gainey et al. | 455/11.1 |

* cited by examiner

Primary Examiner—Matthew D. Anderson
Assistant Examiner—Tan Trinh (57) ABSTRACT

A method and system of wireless signal repeating. A wireless signal repeater may receive a group of signals and select signals to be amplified so as to produce amplified signals. The repeater may also select antenna elements to re-transmit the amplified signals. The repeater may further select areas to direct the elements' radiation patterns in order to provide extensive wireless service to desired areas. The repeater can perform any of these selection functions simultaneously and/or independently, and based on any desired criteria. For example, each signal received into the wireless signal repeater may carry an identifier. The repeater may perform the selection functions based at least in part on the identifiers of the signals.

24 Claims, 5 Drawing Sheets

METHOD AND SYSTEM OF WIRELESS SIGNAL REPEATING

BACKGROUND

A. Field of Invention

The present invention relates to wireless communication systems, and more particularly, to a method and system of wireless signal repeating.

B. Description of Related Art

In a typical wireless communication system, an area is divided geographically into a number of cells, each defined by one or more radiation patterns created by an emission of radio frequency (RF) electromagnetic (EM) waves from a respective base transceiver station (BTS) antenna or antenna array. Further, each cell may be divided into a number of sectors, each defined respectively by radiation patterns from directional antenna elements of the cell's BTS. Each sector typically has a beam width of about 120 degrees. However, sectors can have any desired beam width.

For wireless communications, EM signals are not sent through a transmission line, and therefore antennas and/or antenna arrays are required for the transmission and reception of the signals. An antenna array is a set of antennas working together to produce a particular radiation pattern. Each antenna in the array is referred to as an antenna-element (or simply an element).

The radiation pattern of each sector in a cell produces an air interface, which defines a respective coverage area. When a mobile station (MS), such as a cellular telephone, is positioned within such a coverage area of a sector in a cell, the air interface provides a communication path between the MS and the BTS. And the MS can then communicate through this path with entities of the wireless communication system.

Wireless communications from a BTS to an MS are considered to be in a "forward" direction, and therefore such communications are referred to as "forward link" communications. Conversely, wireless communications from an MS to a BTS are considered to be in a "reverse" direction, and therefore such communications are referred to as "reverse link" communications.

Unfortunately, however, both forward and reverse link communications (and other wireless communications) can suffer from varying levels of signal degradation as signals are carried over the air interface between the MS and an antenna of a BTS. For instance, the strength (i.e., power level) of signals transmitted in a forward link direction can diminish substantially as the signals travel over an increased distance to the MS. Further, obstructions such as buildings and foliage can attenuate or otherwise degrade signals passing over the air interface. As a result, forward link signals that arrive at the MS may be too weak to be detected and/or used by the MS, and therefore forward link signals could be undetectable and wireless communications could be blocked or dropped. In addition, the strength of signals transmitted in a reverse link direction can also suffer from similar reductions as the signals travel to the BTS.

One approach that can be used to overcome this difficulty is to increase the power of a signal transmitted by a BTS. A disadvantage with this approach, however, is that the increased power can lead to increased interference in adjacent cells. The power increase can also interfere with other wireless devices in use near the BTS.

Also, this approach does not aid a BTS in receiving a signal transmitted from an MS. Wireless communications are primarily bi-directional communications, in which signals are sent between a BTS and an MS. Therefore, in order to support bi-directional communications, an increase in the transmission power of the BTS would require a corresponding increase in the transmission power of the MS. However, again, an increase in transmission power of the MS could lead to interference with other wireless devices.

Another approach that can be used to increase wireless signal strength is to use wireless signal repeaters. A wireless signal repeater may be able to receive a signal distorted by transmission losses and to regenerate or replicate the signal. Analog repeaters frequently can only amplify the signal while digital repeaters can reconstruct a signal to near its original quality.

For instance, a repeater may be positioned between an MS and a BTS to intercept signals sent between the MS and the BTS. The repeater may amplify the power of these signals and send amplified versions of these signals to the MS or the BTS.

This approach may work in some cases. However, in general not all signals that need to be amplified are intercepted by the repeater. Further, some signals that do not need to be amplified may be amplified, resulting in distorted signals. In addition, existing repeaters lack flexibility in extending coverage to isolated or desired areas. Consequently, a system that overcomes these problems is desirable.

SUMMARY

Generally speaking, in accordance with an exemplary embodiment, a method of wireless signal repeating is provided. The method may be performed within a wireless signal repeater that comprises one or more radiating elements. Each radiating element may be able to transmit radio frequency signals. The method may include receiving into the wireless signal repeater a plurality of wireless signals and selectively repeating at least one of the plurality of wireless signals.

In one embodiment, selectively repeating at least one of the plurality of wireless signals comprises selecting a wireless signal from the plurality of wireless signals and sending the wireless signal to the one or more radiating elements. The one or more radiating elements then radiates the wireless signal. The wireless signal may be selected based on any desired criteria, such as an identifier within the signal or a power level of the signal, for example.

In another embodiment, selectively repeating at least one of the plurality of wireless signals comprises amplifying each of the plurality of wireless signals so as to produce a plurality of amplified signals, selecting an amplified signal from the plurality of amplified signals, and sending the amplified signal to the one or more radiating elements. The one or more radiating elements then radiates the amplified signal.

In still another embodiment, selectively repeating at least one of the plurality of wireless signals comprises selecting a radiating element from the one or more radiating elements to radiate the plurality of wireless signals and sending the plurality of wireless signals to the radiating element. The radiating element then radiates the plurality of wireless signals.

In another respect, the exemplary embodiment may take the form of a wireless signal repeater. The wireless signal repeater may include a selector and an amplifier. The selector may receive a plurality of signals. Each respective signal may have a respective identifier. The selector may select a first signal from the plurality of signals based at least in part on the respective identifier of the first signal and then transfer the first signal to the amplifier. The amplifier may then amplify the first signal so as to produce a first amplified signal.

In still another respect, the exemplary embodiment may take the form of a computer program executed by a processor. The processor may receive a plurality of signals, and based on characteristics of the plurality of signals, the processor may execute machine language instructions to selectively repeat at least one of the plurality of signals.

These as well as other features and advantages will become apparent to those of ordinary skill in the art by reading the following detailed description, with appropriate reference to the accompanying drawings.

BRIEF DESCRIPTION OF FIGURES

Reference is made to the attached drawings, wherein.

DETAILED DESCRIPTION OF EXEMPLARY EMBODIMENTS

A. Wireless Signal Repeater

Figure 1:
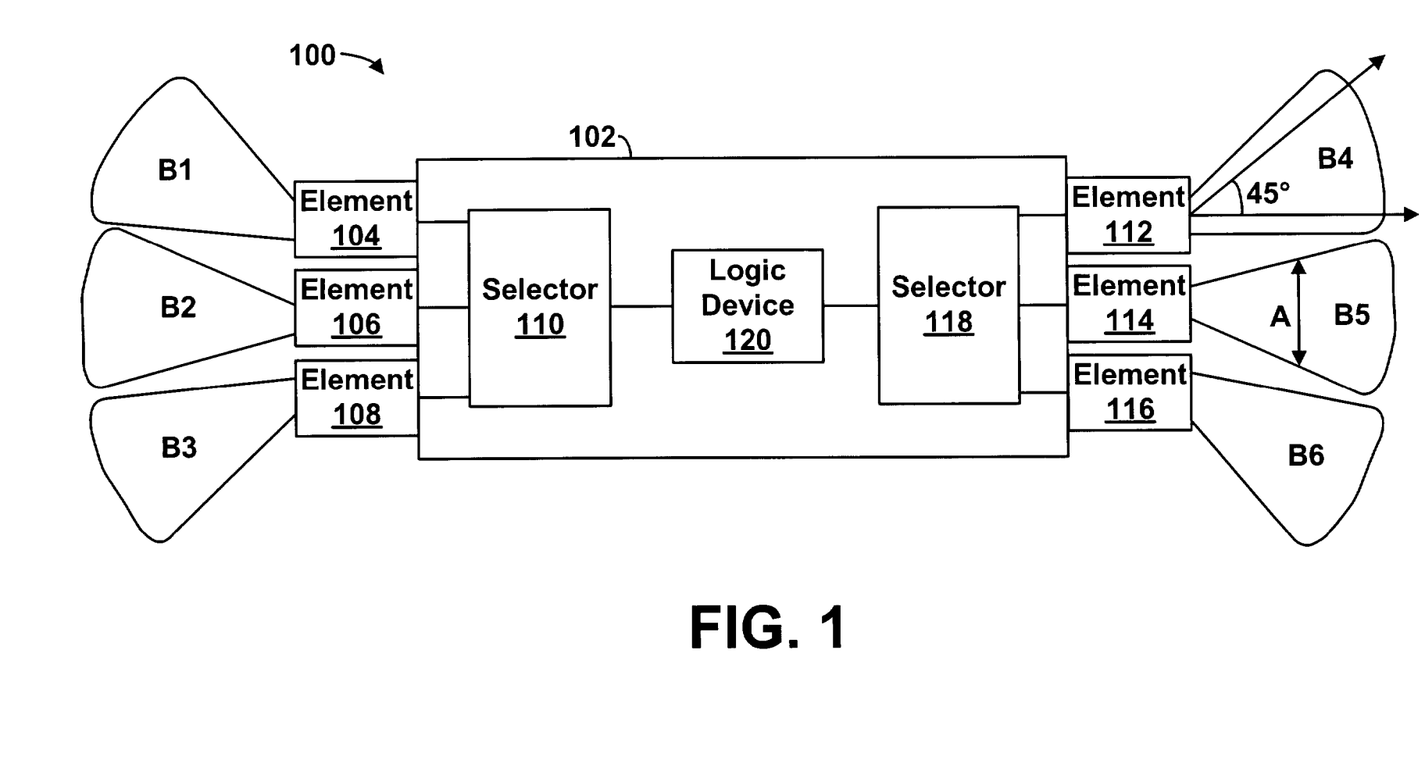
FIG. 1 is a block diagram illustrating one embodiment of a wireless signal repeating system.

In accordance with an exemplary embodiment, a method and system of wireless signal repeating in a wireless communication system, such as a cellular communication network for instance, is provided. Referring now to the figures, FIG. 1 is a block diagram illustrating one embodiment of a wireless signal repeating system 100. It should be understood that this and other arrangements described herein are set forth for purposes of example only, and other arrangements and elements can be used instead and some elements may be omitted altogether. Further, many of the elements described herein are functional entities that may be implemented as hardware, firmware and/or software, and as discrete components or in conjunction with other components, in any suitable combination and location.

The wireless signal repeating system 100 includes a wireless signal repeater 102 that has antenna elements 104, 106, and 108 coupled to a selector 110. The wireless signal repeater 102 also has antenna elements 112, 114, and 116 coupled to another selector 118. The selectors 110 and 118 are each coupled to a logic device 120. Any of these components can take various forms and, additionally, functions of these components (or the components themselves) can be combined if desired (e.g., as a set of software executable by the logic device 120).

The wireless signal repeater 102 may receive, amplify, and re-transmit signals that are transmitted between a BTS and an MS or between any sort of wireless access point and a mobile unit. The wireless signal repeater 102 will typically be positioned mid-way between the BTS and the MS in order to intercept signals sent between the two.

The wireless signal repeater 102 may receive signals at the elements 104, 106, and 108. Each of the elements may have communication paths to the selector 110, through which the elements can transfer the signals. The selector 110 may receive signals from the elements 104, 106, and 108 and send the signals to the logic device 120, which may amplify the signals, and in turn send the signals to selector 118. Finally, selector 118 may send the signals to elements 112, 114, and 116 to be re-transmitted. The wireless signal repeater 102 may also operate in the opposite direction as well.

The antenna elements 104, 106, 108, and 112, 114, 116 each may be any radiating element that can radiate in a specified direction or directions. The size and shape of the elements may determine whether a uniform or non-uniform radiation pattern is produced. Large elements typically produce non-uniform radiation patterns and small elements typically produce uniform radiation patterns. A uniform radiation pattern (i.e., omni-directional pattern) may result due to energy radiating from the element and arriving at a distant point in phase. A non-uniform radiation pattern may result due to radiated energy arriving at the distant point out of phase (i.e., at different times).

An antenna radiation pattern is also referred to as an antenna-beam or beam. A beam width of an element is a measure of directivity and is usually defined by an angle where the radiation pattern reduces to one half of its peak value or more commonly referred to as 3 decibel power level (3 dB points). Elements 104, 106, and 108 are shown to produce beams B1, B2, and B3. Similarly, elements 112, 114, and 116 are shown to produce beams B4, B5, and B6. The beams are shown directed at different azimuths. For example, beam B1 of element 104 and B4 of element 112 are positioned at a 45° azimuth. Conversely, beams B3 and B6 are positioned at a −45° azimuth. Beams B2 and B5 are positioned at a 0° azimuth. Each of beam B1, B2, B3, B4, B5, and B6 have the same beam width, illustrated as length A on beam B4 of element 114. The beams of any of the elements of the wireless signal repeater 102 may be positioned (dynamically or in fixed formation) at any azimuth and may also have any desired beam width based on the size and shape of the elements.

The elements 104, 106, 108 and 112, 114, 116 are illustrated positioned outside of the wireless signal repeater 102. However they may be included within the wireless signal repeater 102 as well.

The selectors 110 and 118 can take various forms. For instance, the selectors 110 and 118 may be logic comprising a multiplexer that can select signals based on an input control signal. The selectors 110 and 118 may also be processing units, such as a programmable digital signal processing engine or an application specific integrated circuit (ASIC), which may be able to execute machine language instructions to perform functions of the selectors 110 and 118. The selectors 10 and 118 may include data storage to hold a set of the machine language instructions as well.

The selectors 110 and 118 may also include a radio receiver, a radio transmitter, and/or filters. The filters may be arranged to pass signals only in a desired frequency range such as about 1930 to 1990 MHz, though other examples are possible as well. The filters may also be arranged to pass only uplink (reverse link) signals or downlink (forward link) signals. Furthermore, the selectors 110 and 118 can monitor signals received from the logic 120 by measuring a voltage and/or current of the signals. Selectors 110 and 118 may be combined into one device, which may be able to route signals accordingly.

The logic device 120 may include circuitry that performs functions of an amplifier. The logic device 120 can be a variable gain amplifier, which may be set to amplify input signals' power levels to a desired extent, so as to produce output amplified signals. For example, the logic device 120 may have between a 60 to 90 dB power gain between input and output signal power levels. However, other examples are possible as well. The logic device 120 may also include filters and other noise limiting circuitry.

Each selector 110 and 118 may receive an amplified signal from the logic device 120 and determine the signal's strength (or power level). If either selector 110, 118 determines that the signal strength of the amplified signal exceeds a predefined threshold, the selector 110, 118 may reduce an amount of gain applied by the logic device 120. Conversely, if either selector 110, 118 determines that the signal strength of a signal amplified by the logic device 120 is below the predefined threshold, then the selector 110, 118 may increase the amount of gain applied by the logic device 120.

Figure 2:
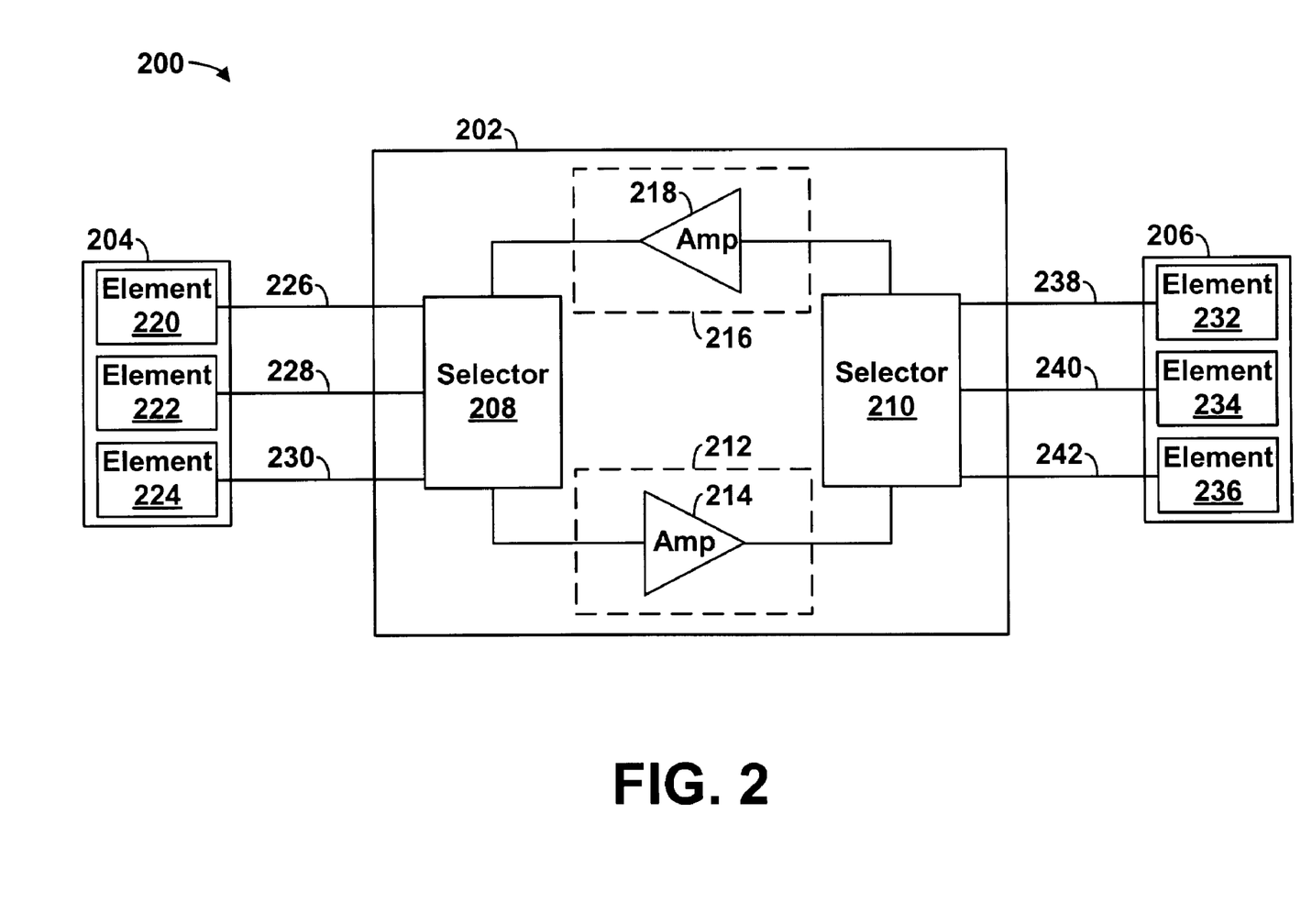
FIG. 2 is a block diagram illustrating another embodiment of a wireless signal repeating system.

FIG. 2 is a block diagram illustrating another embodiment of a wireless signal repeating system 200. The wireless signal repeating system 200 is shown to include a wireless signal repeater 202 coupled to antenna-arrangements 204 and 206 (which may either be internal or external to the wireless signal repeater 202). The components of the wireless signal repeater 202 may be similar to those discussed in relation to FIG. 1.

The wireless signal repeater 202 is shown to include selectors 208 and 210. A communication pathway is established from selector 208 to selector 210 through forward link circuitry 212, which comprises an amplifier (amp) 214. Likewise, a communication pathway is established from selector 210 to selector 208 through reverse link circuitry 216, which comprises an amplifier (amp) 218. The amps 214 and 218 may be any power-amplifying devices.

Antenna-arrangement 204 has antenna elements 220, 222, and 224, which are each coupled to selector 208 through communication paths 226, 228, and 230. Similarly, antenna-arrangement 206 has antenna elements 232, 234, and 236, which are each coupled to selector 210 through communication paths 238, 240, and 242. Antenna-arrangements 204 and 206 may be any antenna system with multiple antennas or any antenna array with multiple antenna elements and may have more of fewer antenna elements than are illustrated.

The wireless signal repeater 202 may separately process forward link signals in the forward link circuitry 212 and reverse link signals in the reverse link circuitry 216. Antenna-arrangement 204 may be a "donor antenna" which is directed toward a serving BTS. That is, the elements 220, 222, and 224 may receive signals from BTSs on the forward link. Antenna-arrangement 206 may be a "re-radiating antenna" which is directed toward an MS. Elements 232, 234, and 236 may be directed to transmit signals to the MS. The wireless signal repeater 202 may operate simultaneously to boost signals on both the forward link and the reverse link.

However, since the wireless signal repeater may operate bi-directionally, forward and reverse link signaling are matters of perspective that depend upon received signal orientations at the repeater 202 at any given time. Therefore, the wireless signal repeater 202 may boost signals on the forward link using either the forward or reverse link circuitry 212 and 216 and boost signals on the reverse link using either the forward or reverse link circuitry 212 and 216. Either antenna-arrangement 204, 206 can receive signals from a BTS or an MS. Additionally, either antenna-arrangement 204, 206 can transmit signals to a BTS or an MS.

Figure 3:
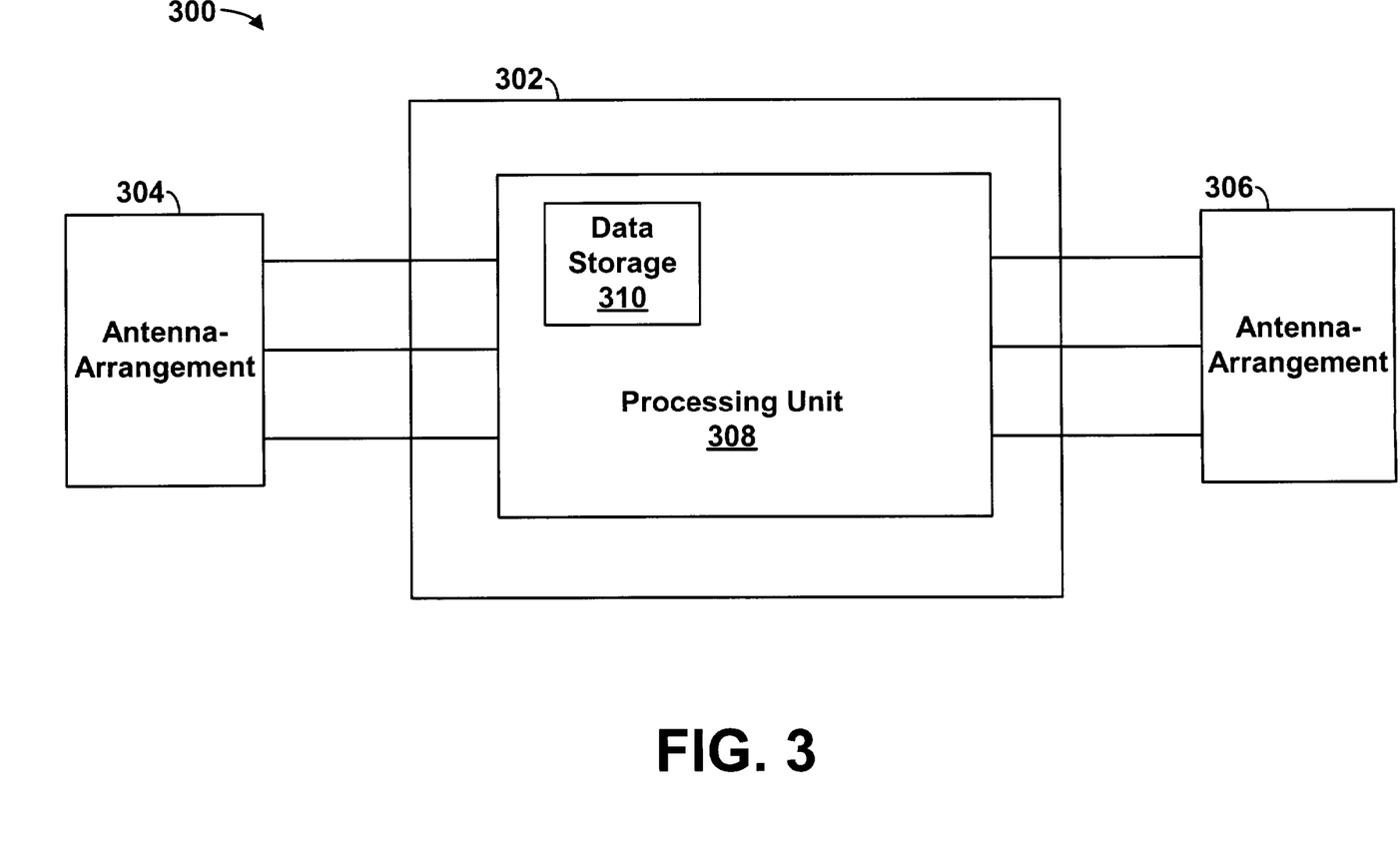
FIG. 3 is a block diagram illustrating another embodiment of a wireless signal repeating system.

FIG. 3 is a block diagram illustrating another embodiment of a wireless signal repeating system 300. The wireless signal repeating system 300 includes a wireless signal repeater 302 coupled to antenna-arrangements 304 and 306. The wireless signal repeater includes a processing unit 308, which includes data storage 310. The data storage 310 may alternatively be external to the processing unit 308.

The processing unit 308 may be any processing unit, such as a digital signal processor (DSP), that is operable to execute machine language instructions. The processing unit 308 may also comprise multiple processors as well. Machine language instructions may be stored within the data storage 310. The machine language instructions may be executed by the processing unit 308 to perform functions of the selectors 208, 210 and amps 214, 218 of the wireless signal repeater 202. The wireless signal repeater 302 may receive a group of signals from the antenna-arrangements 304, 306 and the processing unit 308 may execute the machine language instructions in order to repeat these signals.

The machine language instructions may take any form, and may be, for example, provided using software with object-oriented machine language instructions, such as the C++ programming language. However, other programming languages (such as the C programming language for instance) could be used as well.

In the exemplary embodiment, the wireless signal repeating systems 100, 200, 300 are "smart" repeating systems. The wireless signal repeating systems 100, 200, 300 may selectively determine a communication pathway through the systems 100, 200, 300 for a signal based on contents or characteristics of the signal, such as a frequency of the signal, a system identification code (SID) of the signal, and/or other identifiers or identification codes of the signal. The wireless repeating systems 100, 200, 300 may have several communication pathways. For example, system 100 has communication pathways comprising antenna element beams, antenna elements, selectors, and logic. A signal may be directed through any of these components, and possibly not directed through some, based entirely or at least in part on any desired predefined parameter. As used herein, a communication pathway defines a pathway through the systems 100, 200, 300 through which a signal may be routed.

Rather than blindly receiving signals, amplifying the signals, and retransmitting the signals, as in existing wireless repeaters, the wireless signal repeating systems 100, 200, 300 may selectively repeat signals. This provides an efficient manner of processing signals, since only signals selected will be repeated (for example, only those selected may be amplified and re-transmitted).

A wireless signal may take any form including analog and digital signals. As an example, a wireless signal may comprise frames, slots, and channels that organize digital bits (i.e., electrical impulses translated into "1's" and "0's") of information. Frames hold slots (e.g., time slots), which hold channels. Specific time slots may be dedicated paired frequencies, which are the channels. Each signal received at the systems 100, 200, 300 may carry a unique identifier, which identifies the type of the signal, for example. The identifier may be included within a "control" channel of the signal, which may be a first pair of time slots. Example types of identifiers may include identifiers which correspond to signaling protocols such as global system for mobile communications (GSM), code division multiple access (CDMA), etc. Other types of identifiers exist as well.

In one embodiment, a wireless signal may be repeated (or not repeated) based on a communication pathway that it travels through within the systems 100, 200, 300. The communication pathways within the systems 100, 200, 300 can be selected based on the type of the signal (i.e., based on the identifier within the signal). Communication pathways may also be selected based on other criteria as well, such as current and/or past signal traffic patterns within the systems 100, 200 (e.g., if a pathway is overloaded or busy, an alternate pathway may be selected), a time of day, and/or other geographic or functional settings.

B. Operation of Wireless Signal Repeater—Selecting Signals

Figure 4:
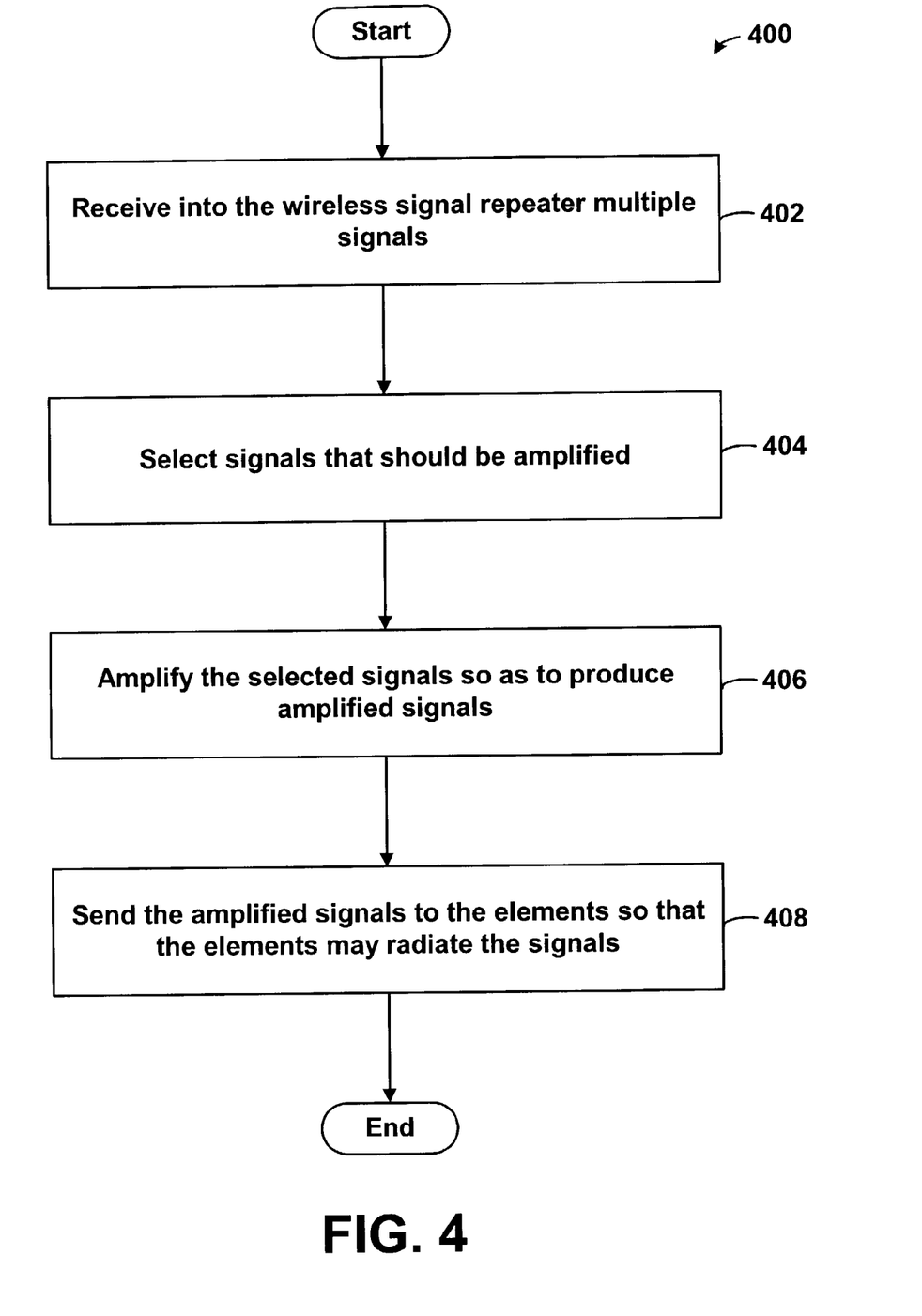
FIG. 4 is a flowchart depicting functional blocks of a method according to one embodiment.

In an exemplary embodiment, the wireless signal repeating systems 100, 200, 300 may receive multiple signals and selectively repeat signals by determining which of these signals are to be amplified, where only the signals selected to be amplified are then repeated (i.e., transmitted by the repeater). FIG. 4 is a flowchart generally illustrating a method 400 relating to this process. As shown at block 402, multiple signals may be received into the wireless signal repeater 202. For example, the antenna array 204 may receive a signal at each of elements 220, 222, and 224 and forward these signals into the wireless signal repeater 202 to the selector 208 through communication paths 226, 228, and 230. The selector 208 may select signals that should be amplified, as shown at block 404. The selector 208 may select signals that should be amplified based on any desired factors or parameters. For example, the selector 208 may determine power levels of received signals, and if any of the received signals has a power level below a predetermined threshold value, then the selector 208 may select and send those signals to the amps 214 or 218 to be amplified.

As another example, the selector 208 may select signals to be amplified based on a distance of the signals' origin point (i.e., a transmitting device) from the wireless signal repeater 202. The signals' origin point may either be a BTS or an MS. If the origin point is close in distance to the wireless signal repeater 202, then it may be assumed that any signals transmitted from this origin point do not need to be amplified because these signals probably will not be attenuated by any substantial amount since the signals have traveled just a small distance.

The wireless signal repeater 202 may determine an origin point of a signal based upon a transmission time of the signal. For instance, the signal may contain a transmission time identifier corresponding to a time that the signal was initially transmitted. The wireless signal repeater 202 may receive the signal and record the time of reception. The signal may be forwarded to the selector 208, which may calculate the difference between the transmission time and the time of reception (e.g., through use of synchronized clock signals, such as a global positioning system (GPS) or CDMA system time for instance), and if the time difference is below a predefined threshold value, then the signal was transmitted from an origin point in close geographic proximity to the wireless signal repeater 202 and therefore the signal does not need to be amplified.

However, if the difference is above the predefined threshold value, then the signal was transmitted from an origin point respectively distant from the wireless signal repeater 202, and it can be assumed that the signal has been attenuated from its original power level. Therefore, the wireless signal repeater 202 may select this signal to be amplified. The wireless signal repeater 202 may select signals to be amplified based on other criteria or other identifiers of the signals as well.

Referring back to FIG. 4, the amp 214, 218 will receive the selected signals from the selector 208, 210. As shown at block 406, the amp 214, 218 then amplifies the selected signals so as to produce amplified signals. The amp 214, 218 may then send the amplified signals to selector 210, 208. The selector 210, 208 may send the amplified signals to the elements so that the elements may radiate the signals, as shown at block 408. The transfer of signals through the repeater 202 occurs in one direction. For example, a signal is sent from the amp 214 to the selector 210 and then to the elements. However, the same signal transfer may be simultaneously occurring in the other direction as well.

C. Operation of Wireless Signal Repeater—Selecting Amplified Signals

In another embodiment, the wireless signal repeating systems 100, 200, and 300 may selectively repeat signals by choosing signals from a group of amplified signals to be repeated. The systems 100, 200, 300 may receive a group of signals and amplify each of the signals. The selectors 210, 208 may then select signals from the amplified signals to be sent to the elements, based on any characteristics of the signals, such as an identifier of the signals. In this manner, all signals received into the wireless signal repeater 202 may be amplified, and the selectors 210, 208 may then choose signals from the amplified signals to be transmitted.

For example, the selectors 210, 208 may receive a group of amplified signals from the amps 214, 218 and select signals from these amplified signals to be sent to the elements based on an SID of the signal. If the signal carries an SID of a wireless carrier for which element 232 of the system 200 provides radiation coverage into, then the selectors 210, 208 may select the signal and transfer the signal to the element 232, which may then radiate the signal into its corresponding coverage area.

D. Operation of Wireless Signal Repeater—Selecting Radiating Elements

Figure 5:
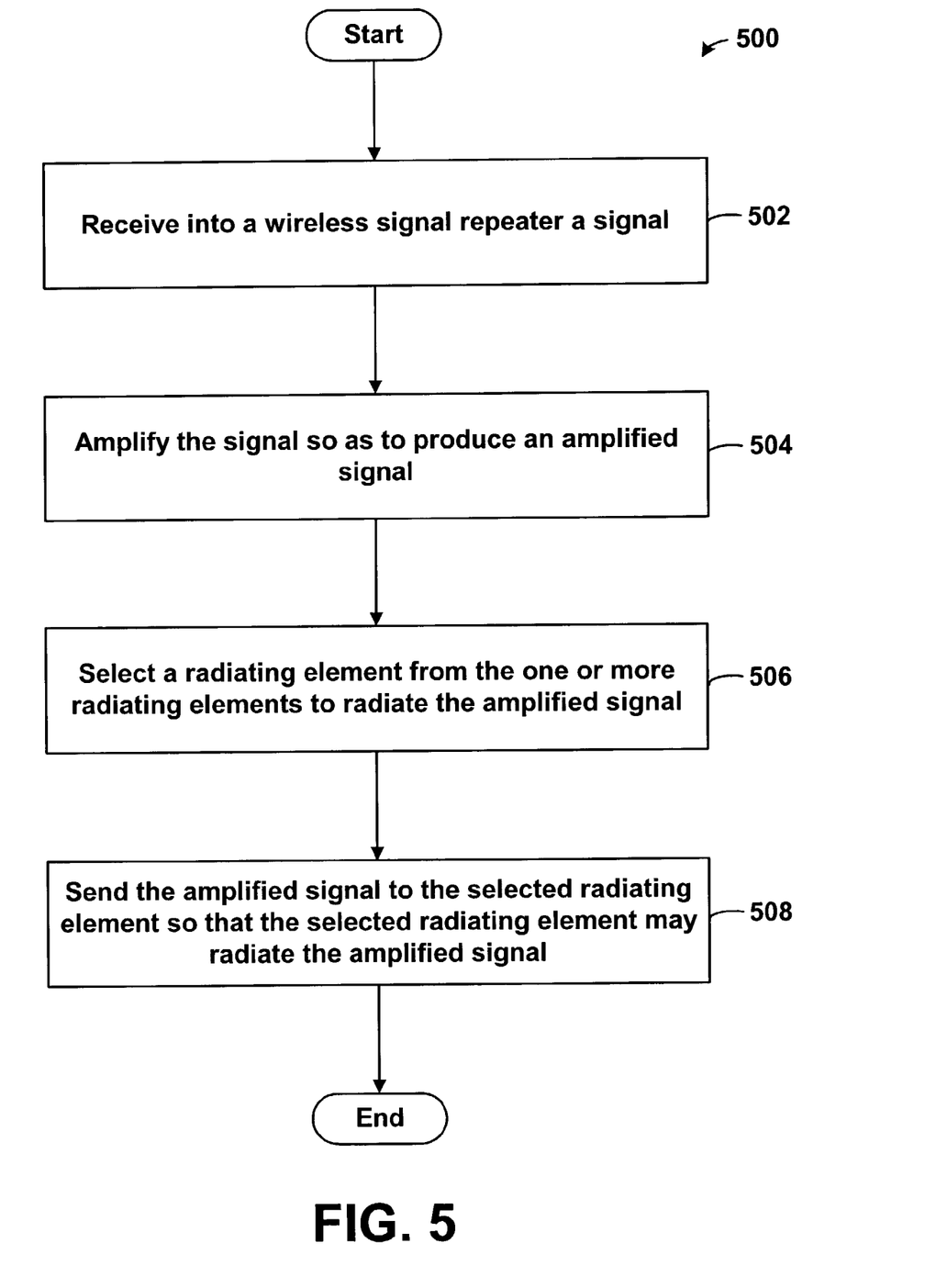
FIG. 5 is a flowchart depicting functional blocks of a method according to one embodiment.

In another embodiment, the wireless signal repeating systems 100, 200, 300 may receive a group of signals and selectively repeat signals by selecting one or more radiating elements to radiate or re-transmit the signals based at least in part on content of the signals. (In this manner, only a portion of a communication pathway through the systems 100, 200, 300 may be selectively determined. A remainder of the communication pathway may be based on a default or pre-determined pathway, for instance.) FIG. 5 is a flowchart generally illustrating a method 500 relating to this process. As shown at block 502, a wireless signal repeater, such as wireless signal repeater 202, may receive a signal, for example at element 220. The element 220 may send the signal to the selector 208 across communication path 226. The selector 208 may directly forward the signal to amp 214. As shown at block 504, the amp amplifies the signal so as to produce an amplified signal. The amp 214 may send the amplified signal to the selector 210.

The selector 210 may select an element from the elements 232, 234, and 236 to radiate the amplified signal, as shown at block 506. The selector 210 may then send the amplified signal to the selected element so that the selected element may radiate the amplified signal, as shown at block 508.

In one instance, the selector 210 may select a radiating element based on a SID of the signal. For instance, a particular wireless carrier may provide wireless services in a specified area. Antenna element 232 may be directed to radiate in the direction of this area. If the amplified signal has an identifier that is an SID corresponding to this wireless carrier, the selector 210 may select element 232 to radiate the amplified signal so as to transmit the amplified signal in an area designated for this type of signal.

As another example, a signal received at the wireless signal repeater 202 may contain an identifier that is a destination identifier corresponding to a location of an MS to which the signal was intended to be transmitted (though, the wireless signal repeater 202 intercepted the signal). If the wireless signal repeater 202 knows that the MS is within coverage area B2 of element 234, which might be established by the destination identifier within the signal, then the selector 210 may select element 234 to radiate the signal to the MS. This may produce a more efficient manner of transmitting the signal to the MS.

The selector 210 may also direct the beams of elements 220, 222, 224, and 232, 234, 236 to radiate in a desired direction and then chose a radiating element to radiate a signal. The selector 210 may direct the beams by changing the beams' azimuths and beam widths. The selector 210 may send a control signal to the antenna-arrangements 204, 206 which can direct the elements 220, 222, 224, and 232, 234, 236 to radiate EM waves at the desired azimuth and width by radiating EM waves at different phases or at different time intervals. The beams of the wireless signal repeating system 200 may be directed in any direction and/or multiple beams may be directed in the same direction. Each beam can be directed to a respective area based on any desired criteria.

In one instance, beams may be directed to respective areas to be utilized for a respective frequency and/or application. For example, a beam of element 232 may be used for CDMA personal communication services (PCS) operating at 1.9 GHz. CDMA PCS services may have cells in an area north of the wireless signal repeating system 200, therefore element 232 may be set to radiate at an azimuth of 45° relative to the wireless signal repeater 202 in order to transmit signals into the CDMA PCS cells. Additionally, a beam of element 234 may be used for GSM, which operates at a different frequency and has a cell in an area south of the wireless signal repeating system 200. The wireless signal repeater 202 may direct the element 234 to radiate at an azimuth of −45° relative to the wireless signal repeater 202 in order to transmit signals into the GSM cell.

The wireless signal repeater 202 may be capable of repeating signals transmitted using more than one frequency. For example, both a CDMA and a GSM network may simultaneously use the wireless signal repeater 202. Different beams of the wireless signal repeating system 200 may be directed towards either the CDMA or the GSM network (or both). Therefore, one wireless signal repeater can provide coverage extension for more than one network, which may reduce installation costs of multiple repeaters and also eliminate site-zoning issues for installation of additional wireless signal repeaters.

The specific examples presented herein are illustrative only. Many other examples exist as well.

E. Other Examples

The wireless signal repeating systems 100, 200, 300 may receive instructions from a BTS that direct the systems to selectively repeat signals by determining communication pathways for signals, and/or selecting a respective area to direct each respective radiation pattern of the antenna elements. Alternatively, the wireless signal repeating systems 100, 200, 300 may be programmed with instructions directing the systems to perform these functions in a desired manner.

The wireless signal repeating systems 100, 200, 300 may be installed or positioned at any location within a wireless communication system such that the wireless signal repeater systems 100, 200, 300 are positioned between a BTS and an MS or between any sort of wireless access point and a mobile unit. In one instance, the systems 100, 200, 300 may be installed on a BTS tower, for example, positioned along a highway. Alternatively, the systems 100, 200, 300 may be installed on top of a building, for example, to repeat signals into the building. However, the systems 100, 200, 300 may be installed in other areas as well.

Those skilled in the art to which the present invention pertains may make modifications resulting in other embodiments employing principles of the present invention without departing from its spirit or characteristics. Accordingly, the described embodiments and examples are to be considered in all respects only as illustrative, and not restrictive, and the scope of the present invention is, therefore, indicated by the appended claims rather than by the foregoing description. Consequently, modifications apparent to those skilled in the art would still fall within the scope of the invention.

For example, although the foregoing description focuses mainly on wireless signal transmission between BTSs and MSs as in a wireless communication system (e.g., time division multiple access (TDMA) network, frequency division multiple access (FDMA) network, CDMA network, etc.), the method and system presented herein can be equally applied to help boost wireless signal communications of other sorts, such as communications according to the IEEE 802.11 wireless LAN protocol, the Bluetooth™ wireless technology, and/or possibly cordless telephone communications. Further, the invention could extend to apply in peer-to-peer wireless communications, such as from an MS to an MS or from an access point to an access point (rather than mobile node to access point or vice versa).

Additionally, although in some instances the foregoing description focuses on independent selection operations of a wireless signal repeater, the selection methods presented herein may be performed simultaneously in any combination. For example, the wireless signal repeater 202 may select a respective area to direct elements, then select a signal from a group of received signals within this respective area to be amplified, and then select antenna elements to re-transmit the group of received signals (whether they were amplified or not). Other examples are possible as well.

I claim:

1. In a wireless signal repeater comprising one or more radiating elements, each radiating element being operable to transmit radio frequency signals to a respective area so as to provide coverage for a respective wireless service provider, a method comprising:

receiving into the wireless signal repeater a plurality of wireless signals;

sending the plurality of wireless signals to the one or more radiating elements;

selecting at least one of the plurality of wireless signals to be repeated to a given coverage area;

based at least in part on the respective wireless service provider that provides service to the given coverage area, selecting a radiating element from the one or more radiating elements to radiate the at least one of the plurality of wireless signals; and the selected radiating element radiating the at least one of the plurality of wireless signals to the given area.

2. The method of claim 1, wherein each wireless signal of the plurality of wireless signals includes an identifier, and wherein selecting the at least one of the plurality of wireless signals to be repeated comprises selecting the wireless signal based at least in part on the identifier of the wireless signal.

3. The method of claim 2, wherein the identifier is selected from the group consisting of a system identification code (SID), a transmission time identifier, a destination identifier, and a signaling protocol identifier.

4. The method of claim 1, wherein selecting the at least one of the plurality of wireless signals to be repeated comprises selecting the wireless signal based at least in part on a condition selected from the group consisting of a power level of the wireless signal, a time of day, a past traffic signal pattern, a current traffic signal pattern, a transmission time of the wireless signal, and a frequency of the wireless signal.

5. The method of claim 1, wherein each signal of the plurality of wireless signals is transmitted from a respective origin location, and wherein selecting the at least one of the plurality of wireless signals to be repeated comprises selecting the wireless signal based at least in part on a distance between the wireless signal repeater and the wireless signal's origin location.

6. The method of claim 1, further comprising:
amplifying each of the plurality of wireless signals so as to produce a plurality of amplified signals; and
sending the plurality of amplified signals to the one or more radiating elements, whereby the one or more radiating elements then radiates the plurality of amplified signals.

7. The method of claim 6, further comprising selecting an amplified signal from the plurality of amplified signals prior to sending the plurality of amplified signals to the one or more radiating elements.

8. The method of claim 7, wherein each wireless signal of the plurality of wireless signals includes an identifier.

9. The method of claim 8, wherein selecting the amplified signal comprises selecting the amplified signal based at least in part on the identifier.

10. The method of claim 8, wherein the identifier is selected from the group consisting of a system identification code (SID) and a destination identifier.

11. The method of claim 1, wherein selecting the radiating element comprises selecting the radiating element based at least in part on the identifier.

12. The method of claim 1, wherein selecting the radiating element comprises selecting the radiating element based at least in part on a condition selected from the group consisting of a time of day, a past traffic signal pattern, a current traffic signal pattern, and a frequency of the plurality of wireless signals.

13. The method of claim 1, wherein radiating the at least one of the plurality of wireless signals comprises repeating the at least one of the plurality of wireless signals between a wireless access point and a mobile unit.

14. The method of claim 1, wherein radiating the at least one of the plurality of wireless signals comprises repeating the at least one of the plurality of wireless signals between a first mobile unit and a second mobile unit.

15. The method of claim 1, wherein radiating the at least one of the plurality of wireless signals comprises repeating the at least one of the plurality of wireless signals between a first wireless access point and a second wireless access point.

16. A wireless signal repeater comprising:
a selector operable to receive a plurality of signals, each respective signal having a respective identifier, the first selector being operable to select a first signal from the plurality of signals based at least in part on the respective identifier of the first signal;
an amplifier coupled to the first selector, the amplifier receiving the plurality of signals from the selector and being operable to amplify each of the plurality of signals so as to produce a plurality of amplified signals; and
a second selector coupled to the amplifier, the second selector receiving the plurality of amplified signals and being operable to select an amplified signal from the plurality of amplified signals based at least in part on the identifier of the amplified signal.

17. The wireless signal repeater of claim 16, wherein the selector is a device selected from the group consisting of a multiplexer and a processing unit.

18. The wireless signal repeater of claim 16, wherein the respective identifier of each respective signal is selected from the group consisting of a system identification code (SID), a transmission time identifier, and a destination identifier.

19. The wireless signal repeater of claim 16, wherein the selector selects the first signal from the plurality of signals based also on a condition selected from the group consisting of a power level of the first signal, a time of day, a past traffic signal pattern, a current traffic signal pattern, a transmission time of the first signal, a reception time of the first signal, and a frequency of the first signal.

20. The wireless signal repeater of claim 16, further comprising one or more antenna elements, each antenna element being operable to radiate the amplified signal.

21. The wireless signal repeater of claim 20, wherein the second selector selects an antenna element from the one or more antenna elements to radiate the amplified signal.

22. The wireless signal repeater of claim 21, wherein the second selector selects the antenna element based at least in part on a condition selected from the group consisting of a time of day, a past traffic signal pattern, a current traffic signal pattern, and a frequency of the amplified signal.

23. A system comprising:
one or more antenna-arrangements, each antenna-arrangement having antenna elements that are each operable to provide a radiation pattern defining an air interface for transmitting and receiving signals; and
a wireless signal repeater coupled to the one or more antenna-arrangements, the wireless signal repeater receiving a group of signals from the one or more antenna arrangements and selectively determining which signals from the group of signals are to be amplified so as to produce amplified signals and selectively determining which antenna elements from the one or more antenna-arrangements are to transmit the amplified signals,
wherein the selected signals are amplified by the wireless signal repeater and then radiated by the selected antenna elements to a given coverage area,
wherein the wireless signal repeater selectively determines which signals from the group of signals are to be amplified based at least in part on a respective wireless service provider that provides service to the given coverage area.

24. The system of claim 23, wherein the wireless signal repeater selectively determines which signals from the group of signals are to be amplified and which antenna elements from the one or more antenna-arrangements are to transmit the amplified signals based at least in part on a condition selected from the group consisting of a power level of the signals, a time of day, a past traffic signal pattern, a current traffic signal pattern, a transmission time of the signal, a reception time of the signals, and a frequency of the signals.

* * * * *